United States Patent [19]

MacKinnon

[11] 3,968,666

[45] July 13, 1976

[54] AUTO ANTI-THEFT DEVICE

[76] Inventor: Richard B. MacKinnon, Oakland Heights Bldg., Apt. 12, Exeter, N.H. 03833

[22] Filed: Nov. 29, 1974

[21] Appl. No.: 528,095

Related U.S. Application Data

[63] Continuation-in-part of Ser. No. 370,358, June 15, 1973, abandoned.

[52] U.S. Cl. ............................................. 70/243
[51] Int. Cl. ............................................. B60r 25/04
[58] Field of Search ............... 70/243; 123/198 B; 137/351, 352, 353, 354, 355; 180/114; 307/10 AT; 317/134; 340/63

[56] References Cited
UNITED STATES PATENTS

| | | | |
|---|---|---|---|
| 2,745,478 | 5/1956 | Arens et al. | 137/351 |
| 3,303,836 | 2/1967 | Burleigh | 123/198 B |
| 3,657,697 | 4/1972 | Schultz | 340/64 |
| 3,760,898 | 9/1973 | Kendall | 180/114 |

*Primary Examiner*—Richard E. Moore
*Attorney, Agent, or Firm*—Wolf, Greenfield & Sacks

[57] ABSTRACT

A solenoid-operated valve is disposed in the fuel line of an automobile to interrupt the fuel flow to the carburetor when the solenoid is deenergized. The solenoid operated valve is maintained in its fuel-open position only when both the automobile ignition switch is closed and a supplementary concealed switch is closed. The circuitry for operating the valve may include either a relay or an electronic device. An indicator light is illuminated during the fuel-closed position of the solenoid operated valve as a reminder that both switches must be operated to permit vehicle movement.

13 Claims, 2 Drawing Figures

AUTO ANTI-THEFT DEVICE

RELATED APPLICATION

This is a continuation-in-part of application Ser. No. 370,358 filed June 15, 1973 now abandoned.

BACKGROUND OF THE INVENTION

The present invention relates in general to an anti-theft device for an automobile. More particularly, the present invention is concerned with an anti-theft device of the type for interrupting the flow of fuel to the carburetor or engine.

Automobiles are presently provided with one or more locking devices for preventing an unauthorized party from either gaining access to the vehicle or being able to drive the vehicle. However, in spite of many different types of locking devices most of which are of the totally electric type, there are still many vehicle thefts that take place.

In addition, there have been developed devices that are employed in the fuel line of the vehicle for interrupting the fuel flow. Many of these devices, however, have possessed disadvantages which render them not useful from a practical standpoint. For example, some of these devices are unduly complex and thus are costly. Other devices are not sufficiently theft proof.

Accordingly, it is an object of the present invention to provide an improved anti-theft device for an automobile and of the type that interrupts the fuel flow to the carburetor.

Another object of the present invention is to provide an anti-theft device that includes means for indicating to an authorized operator of the vehicle that the system is in an interrupting condition.

Still a further object of the present invention is to provide an anti-theft device that is relatively simple in construction, that is easy to install, that is durable, and that may be manufactured at a relatively low price.

SUMMARY OF THE INVENTION

To accomplish the foregoing and other objects of this invention there is provided an anti-theft device for a vehicle having an ignition switch receiving energy from a battery of the vehicle and a fuel line for delivering fuel to the vehicle engine. The device generally comprises an electrical bistable means which in one embodiment includes a relay having two contacts associated therewith, a switch means that may be a momentary two position switch and that is concealed in an unobvious location in the vehicle, and an electrically operated valve means which may be a conventional solenoid valve and which is operated from the electrical bistable means.

In one embodiment of the invention a conductor wire couples from one of the contacts associated with the relay to the electrically operated valve means. When both the ignition switch and the concealed switch are closed, energy is coupled to the coil of the relay thereby energizing the relay and actuating the solenoid of the valve means to permit fuel flow in the fuel line of the vehicle. Another contact associated with the relay couples to an indicator light which is lit when the solenoid is interrupting fuel flow. This light is a reminder that both switches are to be operated to their energy coupling positions in order to permit vehicle movement. When an unauthorized operator turns the ignition on, the vehicle will start because there may be fuel in the carburetor but the person will travel for only a short distance as the valve is maintained in its closed position.

In another disclosed embodiment of the invention, the bistable means includes a silicon controlled rectifier (SCR) which is rendered conductive when both the concealed switch and the ignition switch are closed thereby operating the valve means to its open position and permitting vehicle movement.

BRIEF DESCRIPTION OF THE DRAWINGS

Numerous other objects, features and advantages of the invention will now become apparent upon a reading of the following detailed description taken in conjunction with the accompanying drawings, in which.

DETAILED DESCRIPTION

Figure 1:
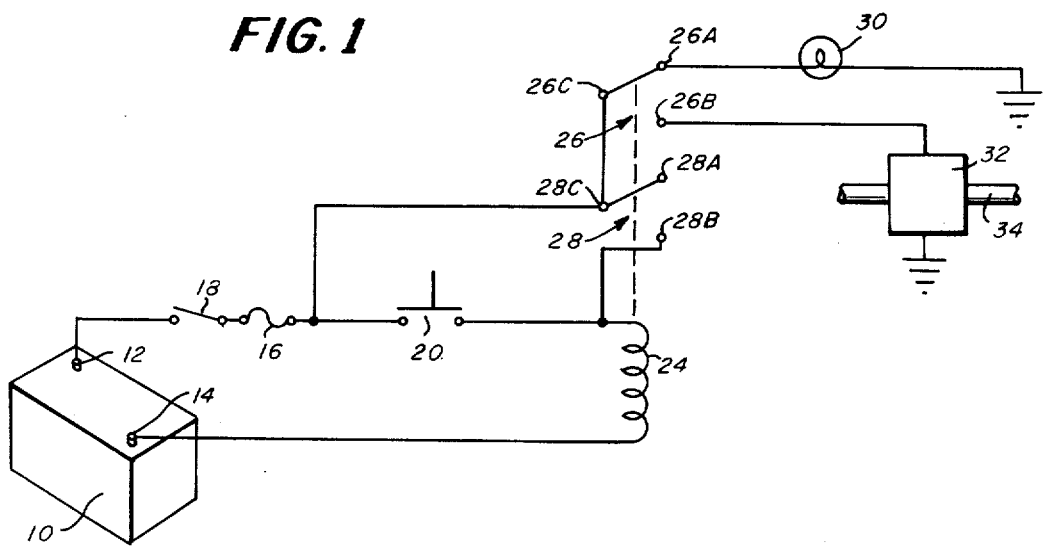
FIG. 1 is a circuit diagram of one embodiment of the anti-theft circuit of this invention.

The device of the present invention is primarily for use in a motor vehicle of the type that includes a storage battery. FIG. 1 shows a circuit of the present invention that connects to a storage battery 10. The battery 10 includes battery posts 12 and 14 which are typically of opposite polarity. A cable connects one battery post 12 to ignition switch 18. The other battery post or terminal couples to one side of relay coil 24.

The ignition switch 18 may be the conventional ignition switch presently available in the motor vehicle and when it is in its closed position the energy from the battery is coupled in a conventional manner to the electrical circuitry for operating the vehicle which conventionally comprises a high voltage coil not shown in the drawings.

The moveable contact of ignition switch 18 couples through fuse 16 to auxiliary switch 20. The switch 20 may be a momentary contact switch which has its other side coupled to relay coil 24. It can be seen that when both the ignition switch 18 is closed and the auxiliary switch 20 is also closed then a current is provided through coil 24 to cause the relay to be energized.

The relay coil 24 of the relay has two contacts 26 and 28 associated therewith. In the position shown in the drawing the coil is deenergized because one or both of the switches 18 and 20 are open, and the contacts are in the position shown. In this position the moveable arm of contact 28 is coupled from terminal 28C to 28A and with respect to contact 26, from terminal 26C to terminal 26A. Under these conditions, and if the ignition switch 18 is closed, power is provided to the indicator lamp 30. When this lamp is lit this is an indication to the authorized operator that the switch 20 has not yet been closed and that operation of the vehicle is not possible. Actually, in this position the vehicle could be started with the gas that may remain in the carburetor but would operate for only a very short time period.

The drawing also shows a solenoid valve 32 which is electrically operated and connects to terminal 26B. The valve is normally in a closed position preventing fluid flow in gas line 34 and may be operated to an open position by applying a voltage to the solenoid coil 24.

When the operator notices that the indicator light 30 is lit, the authorized operator will then close the switch 20 causing the relay coil 24 to be energized. This moves the contacts 26 and 28 to the position opposite that shown in the drawing. Regarding contact 26, the terminals 26C and 26B are then connected thereby energizing the solenoid 32 and permitting fuel flow in the gas line 34. Concurrently therewith the power to light 30 is interrupted thereby indicating that the solenoid has been operated. Regarding the contact 28 the contact now couples from terminal 28C to terminal 28B thereby providing a latching path for relay coil 24. If the switch 20 is only a momentary switch the latch path maintains the relay energized even if the momentary switch 20 is released to its open position. The relay will then deenergize only when the ignition is turned off thereby removing power by way of the latching path provided by contact 28.

Figure 2:
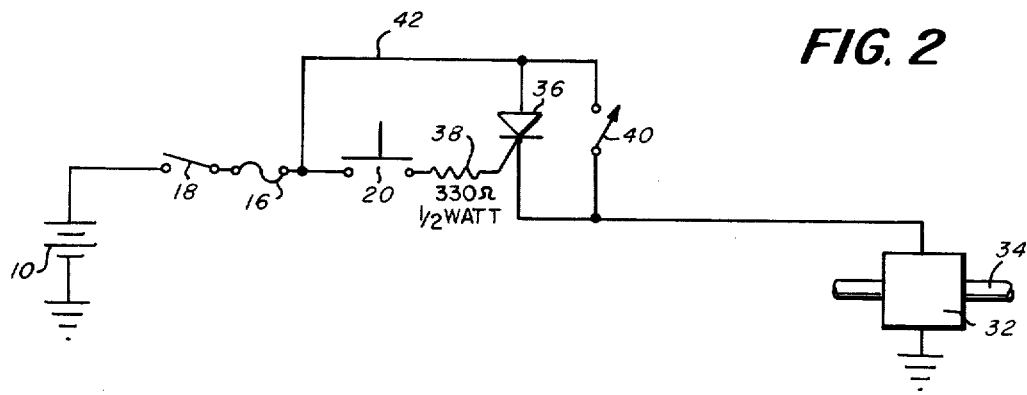
FIG. 2 shows an alternate arrangement of the present invention.

FIG. 2 shows an alternate embodiment of the invention. In FIG. 2 like reference characters will be used as they correspond to like parts shown in FIG. 1. Thus, in FIG. 2 there is shown the battery 10 coupling to ignition switch 18. The ignition switch couples by way of fuse 16 to the concealed switch 20 which is preferably a momentary switch. From there, the circuit couples by way of a limiting resistor 38 to the gate electrode of silicon controlled rectifier 36. The anode of SCR36 couples by way of line 42 back to the ignition switch 18. The cathode of SCR36 couples to valve 32. An additional switch 40 may be provided and is shown in FIG. 2 as coupling across the SCR36.

As with the embodiment of FIG. 1, when both the switches 18 and 20 are closed the battery power couples by way of limiting resistor 38 to the gate electrode of the SCR and fires the SCR. When the SCR conducts the battery voltage is essentially coupled by way of the main terminals of the SCR to the valve 32 to cause operation of the valve to a position to permit fuel flow in the line 34. If the switch 20 is not closed the SCR36 is never activated even though the ignition switch 18 is closed, and the valve 32 is maintained in its fuel-closed position.

The switch 40 is a bypass switch which can be closed to essentially inhibit operation of the SCR. By closing this switch and the ignition switch it can be seen that power is coupled directly to the valve 32 for opening the valve and permitting fuel flow regardless of the position of switch 20. Alternatively, when the switch 40 is maintained in its open position operation can occur by way of the switch 20 and the SCR36 for controlling the valve 32.

Having described one circuit implementation for the device of this invention, it should now become obvious that other embodiments and modifications thereof are contemplated as falling within the scope of the present invention. For example, the momentary switch 20 could be replaced by a normal two position switch such as the ignition switch 18 shown in the drawing. Also, the circuit of this invention is adaptable for use with either a positive ground or a negative ground system. Moreover, there has been shown in the drawing a gas line 34. This gas line may be the line connecting to the fuel pump or could be the line connecting between the fuel pump and the carburetor. The present invention should be limited solely by the appended claims.

What is claimed is:

1. An anti-theft circuit for a vehicle having an ignition switch receiving energy from a battery and a fuel line for delivering the fuel to the engine of the vehicle, said circuit operable by an authorized operator to permit operation of the vehicle and comprising;

electromechanical relay means, a switch means disposed in the vehicle in a position known by an authorized operator but not known by an unauthorized operator, conductor means coupling said switch means in a series circuit with said ignition switch and electromechanical relay means, an electrically-operated valve means disposed in the vehicle fuel line and having an open position and a closed position, and an indicator means, said electromechanical relay means including two sets of contacts at least one of which is responsive to an authorized operator causing both said ignition switch and said switch means to be in a closed position to couple energy to said relay means, for operating said valve means to its open position thereby permitting fuel flow through said valve means, and responsive to an unauthorized operator not closing said switch means to maintain said valve means in its closed position thereby preventing fuel flow through said valve means, each said set of contacts including a common terminal and a pair of selective terminals with the indicator means coupling to one selective terminal of the one set and the valve means coupling to the other selective terminal of the one set whereby the indicating means is adapted to be in its indicating condition when said valve means is closed.

2. The circuit of claim 1 wherein the other set of contacts is a latching contact for the relay, the common terminals of both said sets of contacts coupling to said ignition switch.

3. The circuit of claim 2 wherein said switch means includes a momentary two-position switch.

4. The circuit of claim 3 wherein said indicator means includes an indicator light.

5. A circuit as set forth in claim 3 including a limiting resistor coupled between said gate electrode and switch means.

6. A circuit as set forth in claim 3 including a bypass switch coupled across the main terminals of said controlled rectifier to couple power from the ignition switch to said valve means regardless of whether said switch means is open or closed.

7. An anti-theft device for a vehicle having an ignition switch receiving energy from a battery and a fuel line for delivering the fuel to the engine of the vehicle, said device operable by an authorized operator to permit operation of the vehicle and comprising;

electrical bistable means including a controlled rectifier having two main electrodes and a gate electrode, a switch means disposed in the vehicle in a position known by an authorized operator, conductor means intercoupling said switch means, ignition switch and gate electrode of said controlled rectifier in a series circuit, an electrically-operated valve means disposed in the vehicle fuel line and having an open position and a closed position, and conductor means coupling one of the main electrodes of said rectifier to said valve means, said rectifier being in one state when both said ignition switch and said switch means are operated for operating said valve means to its open position, and being in the other state when the switch means is not operated to maintain said valve means in its closed position.

8. The device of claim 7 including a limiting resistor coupled from the switch means to the gate electrode, a bypass switch coupled across the main electrodes of the controlled rectifier and a conductor coupled from the ignition switch to one of the main electrodes of the rectifier.

9. An anti-theft circuit for use in a vehicle having an ignition switch, a battery and a fuel line, said circuit comprising;

electrical bistable means, a switch disposed in the vehicle in a concealed position known only to an authorized operator, conductor means intercoupling said switch, ignition switch and bistable means in a series circuit, a single action, electrically-operated valve means disposed in the vehicle fuel line and having only an open position and a closed position for only controlling the fuel fed from the gas tank to the carburetor of the vehicle, and conductor means coupling from the bistable means to the valve means, said bistable means being in one state when both said ignition switch and switch are operated for opening the valve means, and being in the other state when the switch is not operated to maintain the valve means closed.

10. A circuit as set forth in claim 9 wherein said bistable means includes a three electrode controlled rectifier including cathode, anode, and gate electrodes.

11. A circuit as set forth in claim 10 including a bypass switch disposed across the cathode and anode electrodes for bypassing the rectifier when closed.

12. A circuit as set forth in claim 11 including a conductor coupled from the ignition switch to the anode and a limiting resistor coupled from the switch to the gate electrode.

13. A circuit as set forth in claim 12 wherein the conductor means couples from the cathode electrode to the valve means.

* * * * *